(12) United States Patent
Bernier et al.

(10) Patent No.: US 10,210,958 B2
(45) Date of Patent: Feb. 19, 2019

(54) METHOD FOR PROCESSING SPENT NUCLEAR FUEL COMPRISING A STEP FOR DECONTAMINATING URANIUM (VI) FROM AT LEAST ONE ACTINIDE (IV) BY COMPLEXING THIS ACTINIDE (IV)

(71) Applicants: COMMISSARIAT À L'ÉNERGIE ATOMIQUE ET AUX ÉNERGIES ALTERNATIVES, Paris (FR); Orano Cycle, Courbevoie (FR)

(72) Inventors: Gilles Bernier, Avignon (FR); Christian Sorel, Villeneuve-les-Avignon (FR); Manuel Miguirditchian, Avignon (FR); Coralie Balaguer, Vinon sur Verdon (FR); Estelle Ameil, Carsan (FR)

(73) Assignees: Commissariat à l'énergie atomique et aux énergies alternatives, Paris (FR); Orano Cycle, Courbevoie (FR)

( * ) Notice: Subject to any disclaimer, the term of this patent is extended or adjusted under 35 U.S.C. 154(b) by 244 days.

(21) Appl. No.: 15/104,154

(22) PCT Filed: Dec. 18, 2014

(86) PCT No.: PCT/EP2014/078453
§ 371 (c)(1),
(2) Date: Jun. 13, 2016

(87) PCT Pub. No.: WO2015/091791
PCT Pub. Date: Jun. 25, 2015

(65) Prior Publication Data
US 2016/0314861 A1    Oct. 27, 2016

(30) Foreign Application Priority Data
Dec. 20, 2013 (FR) ................................ 13 63251

(51) Int. Cl.
C22B 7/00 (2006.01)
G21C 19/44 (2006.01)
(Continued)

(52) U.S. Cl.
CPC .............. G21C 19/46 (2013.01); C22B 7/006 (2013.01); C22B 60/04 (2013.01); G21C 19/44 (2013.01);
(Continued)

(58) Field of Classification Search
None
See application file for complete search history.

(56) References Cited

U.S. PATENT DOCUMENTS

2006/0147359 A1   7/2006   Dinh et al.
2011/0002823 A1   1/2011   Miguirditchian et al.
(Continued)

FOREIGN PATENT DOCUMENTS

FR   2810679 A1   12/2001
FR   2907346 A1   4/2008
(Continued)

OTHER PUBLICATIONS

Sasaki, Y., et al., "Complexation and Back Extraction of Various Metals by Water-soluble Diglycolamide", "Analytical Sciences", Jun. 10, 2007, pp. 727-731, vol. 23.

*Primary Examiner* — Sheng H Davis
(74) *Attorney, Agent, or Firm* — Alston & Bird LLP

(57) ABSTRACT

A method for processing a spent nuclear fuel is disclosed which includes a step for decontaminating uranium(VI) from one or more actinides(IV) and more specially from neptunium and/or plutonium, by complexing this (these) actinide(s)(IV). This method includes a step for decontaminating uranium (VI) from at least one actinide(IV), which decontaminating step comprises at least one operation for
(Continued)

stripping the actinide(IV) from an organic phase, not miscible with water, and wherein uranium(VI) and the actinide (IV) are present, by putting the organic phase into contact with an aqueous phase comprising nitric acid and at least one complexing agent which more strongly complexes actinides (IV) than uranium(VI), and then separating the organic phase from the nitric aqueous phase, wherein the at least one complexing agent is a diglycolamide.

18 Claims, 6 Drawing Sheets

(51) Int. Cl.
G21C 19/46 (2006.01)
G21F 9/06 (2006.01)
G21F 9/30 (2006.01)
C22B 60/04 (2006.01)

(52) U.S. Cl.
CPC .................. *G21F 9/06* (2013.01); *G21F 9/30* (2013.01); *Y02W 30/882* (2015.05); *Y02W 30/883* (2015.05)

(56) References Cited

U.S. PATENT DOCUMENTS

| | | |
|---|---|---|
| 2012/0152059 A1 | 6/2012 | Heres et al. |
| 2013/0202501 A1 | 8/2013 | Saudray et al. |

FOREIGN PATENT DOCUMENTS

| | | |
|---|---|---|
| FR | 2948385 A1 | 1/2011 |
| JP | 2006153790 A | 6/2006 |
| JP | 2011169888 A | 9/2011 |
| WO | 2005052950 A2 | 6/2005 |
| WO | 2007135178 A1 | 11/2007 |
| WO | 2011147871 A1 | 12/2011 |

STATE OF THE ART

METHOD FOR PROCESSING SPENT NUCLEAR FUEL COMPRISING A STEP FOR DECONTAMINATING URANIUM (VI) FROM AT LEAST ONE ACTINIDE (IV) BY COMPLEXING THIS ACTINIDE (IV)

CROSS-REFERENCE TO RELATED APPLICATIONS

This application is a U.S. national phase under the provisions of 35 U.S.C. § 371 of International Patent Application No. PCT/EP14/78453 filed Dec. 18, 2014, which in turn claims priority of French Patent Application No. 1363251 filed Dec. 20, 2013. The disclosures of such international patent application and French priority patent application are hereby incorporated herein by reference in their respective entireties, for all purposes.

TECHNICAL FIELD

The present invention relates to the field of processing spent nuclear fuels.

More specifically, it relates to a method for processing spent nuclear fuel which comprises a step for decontaminating uranium(VI) from one or more actinides(IV) and more specially from neptunium and/or plutonium, by complexing this (these) actinide(s)(IV).

STATE OF THE PRIOR ART

Plants for processing spent nuclear fuels at the present time use the PUREX method (for Plutonium Uranium Refining by EXtraction) for recovering uranium and plutonium present in these fuels.

This is obtained by applying several purification cycles by liquid-liquid extraction. The extractant used is tri-n-butyl phosphate which has particular affinity for uranium and plutonium.

The PUREX method, as it is applied in the plants (UP2-800, UP3) of La Hague in France, schematically comprises three purification cycles, i.e.:
  a first cycle which aims at decontaminating together uranium and plutonium from americium, curium and fission products, and at achieving partition of uranium and plutonium into two aqueous flows; and
  two additional cycles, designated as "second uranium cycle" and "second plutonium cycle" respectively and which aim at purifying separately uranium and plutonium after their partitioning.

As shown in FIG. 1 which illustrates a simplified diagram of the first cycle of the PUREX method, this cycle begins by an operation, designated as "U/Pu co-extraction" in this figure, which consists of extracting together uranium and plutonium, the first in the oxidation state VI, the second in the oxidation state IV, from an aqueous phase in which they are found.

This aqueous phase is obtained by dissolving a spent fuel in nitric acid and by clarifying the thereby obtained mixture. This is commonly called a dissolution liquor. It typically contains from 200 to 250 g/L of uranium for 2 to 3 g/L of plutonium. It also contains neptunium, americium, curium and fission products.

Co-extraction of uranium and plutonium is achieved by means of an organic phase which is not miscible with water, which comprises an extractant having strong affinity for uranium(VI) and plutonium(IV), in this case tri-n-butyl phosphate (or TBP) which is used in solution at 30% (v/v) in an organic diluent, in this case a dodecane (hydrogenated tetrapropylene or TPH). The uranium and plutonium thus pass into the organic phase while americium, curium and the major portion of the fission products remain in the aqueous phase.

This co-extraction is followed by two operations for washing the organic phase, called "PF washing" and "Tc washing", which are achieved by means of nitric aqueous phases with different acidities in order to remove from the organic phase the fraction of fission products, notably technetium, having been extracted together with uranium and plutonium. The "Tc washing" is coupled with an additional operation for co-extraction of uranium and plutonium designated as "complementary U/Pu co-extraction", which is achieved by means of one organic phase, of the same composition as the one used for the "U/Pu co-extraction", in order to recover the uranium and plutonium fraction which may have followed technetium in the aqueous phase during the "Tc washing".

The aqueous phase(s) stemming from these co-extraction and washing operations, to which is given the name of raffinates and which are loaded with americium, curium and fission products, are removed from the cycle, while the organic phase which, for its part, is loaded with uranium(VI) and plutonium(IV), is directed towards an area at which partition of these two elements is achieved.

This partition comprises:
  an operation, designated as "Pu stripping", which aims at stripping plutonium from the organic phase stemming from the co-extraction and washing operations by means of a nitric aqueous phase with low acidity, comprising uranous nitrate allowing to reduce plutonium(IV), which is highly extractible with TBP, into plutonium(III) which, for its part, is only very little extractable and this without reducing the uranium, as well as hydrazinium nitrate, noted as NH in FIG. 1, which plays the role of an anti-nitrous agent;
  an operation, designated as "Pu barrier", which aims at enhancing the stripping of plutonium from the organic phase by means of nitric aqueous phase, also with low acidity and comprising uranous nitrate and hydrazine; and
  an operation, designated as "U stripping", which aims at stripping uranium(VI) from said organic phase by means of a highly diluted nitric aqueous phase.

The stripping of plutonium from the organic phase being accompanied by partial stripping of uranium, the partition further comprises an operation, designated as "U washing", which aims at removing the thereby stripped uranium from the nitric aqueous phase stemming from the "Pu stripping" by means of an organic phase, with the same composition as those used for "U/Pu co-extraction" and "complementary U/Pu co-extraction".

Thus, at the end of the first cycle, are obtained:
  a first aqueous flow which comprises more than 99.9% of the plutonium initially present in the dissolution liquor and which no longer comprises uranium; and
  a second aqueous flow which comprises more than 99.9% of the uranium initially present in the dissolution liquor and which no longer comprises plutonium.

The first aqueous flow stemming from this first cycle is then subject to the "second plutonium cycle", the purpose of which is to enhance decontamination of the plutonium from fission products which may then be still present as traces in this flow. After which, this flow, which comprises plutonium, is directed towards an area where the plutonium is converted into oxide ($PuO_2$), and then stored in this form, with view to subsequent use in the manufacturing of MOX nuclear fuel pellets.

In parallel, the second aqueous flow stemming from the first cycle is subject to the "second uranium cycle" which essentially has the goal of separating uranium from the neptunium.

Indeed, in the first purification cycle, the major portion of the neptunium present in the dissolution liquor is extracted, mainly in the form of neptunium(VI), at the same time as the uranium and the plutonium. During the reducing stripping of plutonium, neptunium(VI) is reduced by uranous nitrate into neptunium(IV), a state in which it is extractible with TBP.

The neptunium therefore quasi quantitatively follows the uranium during all the operations of the first purification cycle, whence the requirement of subjecting the second aqueous flow, loaded with uranium, which stems from the partition, to a complementary purification cycle, giving the possibility of decontaminating this uranium, mainly from neptunium before it is converted into uranium oxide.

Recently, a significant development in the PUREX method, called the COEX™ (for COEXtraction) method, was proposed in the international PCT application published under number WO 2007/135178 (hereafter reference [1]).

Indeed, while ensuring recovery and purification of uranium and plutonium comparable with those obtained in the PUREX method, this development gave the possibility of considerably reducing the risks of misappropriation of plutonium for military purposes. It also allows producing an aqueous flow which comprises a mixture of purified plutonium, uranium and optionally neptunium, i.e. totally decontaminated from fission products, and using this flow for supplying a so called "co-conversion" workshop, the function of which is to prepare a mixed oxide $(U,Pu)O_2$ or $(U,Pu,Np)O_2$ which may be directly used for manufacturing nuclear fuels of the MOX (for Mixed OXide Fuel) type.

To do this, the COEX™ method provides, after operations for co-extracting uranium and plutonium and for washing the organic phase stemming from this co-extraction, which is achieved similarly to those applied in the first purification cycle of the PUREX method, to achieve the partition of the uranium and the plutonium so as to obtain a first aqueous flow comprising plutonium, uranium and optionally neptunium, and a second aqueous flow comprising uranium and optionally neptunium but not comprising any plutonium.

Provision is also made for maintaining, in all the operations located downstream from this partition, plutonium in the presence of uranium and, optionally of neptunium, until the mixed oxide $(U,Pu)O_2$ or $(U,Pu,Np)O_2$ is obtained.

In the versions of the COEX™ method wherein handling the neptunium is designed so that all or part of this element follows uranium into the second aqueous flow stemming from the partition—and which are those illustrated in FIGS. 1, 2 and 4 of reference [1]—, the same requirement is again found as in the PUREX method, i.e. that of subjecting this second aqueous flow to a "second uranium cycle" for clearing uranium of neptunium before it conversion into uranium oxide.

In the perspective of producing new plants for processing spent nuclear fuels, it would be desirable to reach a simplification of the PUREX and COEX™ methods (for the latter, in its versions requiring a "second uranium cycle") so as to both optimize the investment costs, operating and maintenance costs of such plants, without however affecting the performances of these methods as regards yield and processing quality of the spent nuclear fuels.

Indeed, the savings would only be a single purification cycle like the "second uranium cycle" which would allow reduction, not only of the number of apparatuses and equipment required for applying the processing method, but also of the volume of consumed reagents, the volume of the effluents to be treated, the duration of the method and consequently a reduction in the size of the plants, their building costs and their operating costs.

A method giving the possibility of suppressing the "second uranium cycle" of the PUREX method has already been proposed in the international PCT application published under number WO 2005/052950 (hereafter reference [2]).

This method is based on the introduction into the first purification cycle of an operation aiming at decontaminating uranium from neptunium. This operation consists of putting the organic phase which either stems from the "Pu stripping" operation or from the "Pu barrier" operation in contact with a nitric aqueous phase comprising a lacunary heteropolyanion which more strongly complexes actinides(IV) and notably neptunium(IV) than uranium(VI) in an acid aqueous phase. Thus, neptunium(IV) tends to pass into the aqueous phase while uranium(VI) remains, for its part, in the organic phase. The lacunary heteropolyanion is typically a heterotungstate such as an arsenotungstate, a silicotungstate or a germanotungstate.

Now, this method has the major drawback of resorting to complexing agents for actinides(IV) which, in addition to being salts, contain tungsten and metalloid (arsenic, silicon or germanium) atoms which, at an industrial scale, notably complicates the handling of the effluents generated by the decontamination operation of uranium from neptunium.

The Inventors therefore set the goal of providing a method, which, while allowing suppression of the "second uranium cycle" of the PUREX and COEX™ methods, is free of the drawback which the method described in reference [2] has, so as not to add further constraints to the constraints inherent to the PUREX and COEX™ methods, notably in terms of handling of the produced effluents.

Now, within the scope of their work, the Inventors observe that the use of diglycolamides as agents for complexing actinides(IV) gives the possibility of very advantageously replacing the use of lacunary heteropolyanions as proposed in reference [2], not only because diglycolamides represent a family of non-saline compounds, which meets the CHON principle (i.e. they only consist of carbon, hydrogen, oxygen and nitrogen atoms) and which generate gas products after degradation, but also because they lead to factors of decontamination from neptunium which are, for comparable organic phase/aqueous phase contact times, very clearly superior to those obtained with lacunary heteropolyanions.

In particular, the Inventors observe that it is possible to obtain, for organic phase/aqueous phase contact times of a few minutes in mixers-decanters, decontamination factors of uranium from neptunium which meet the most strict specification having been defined to this day by the UNIREP (for UNItedREProcessors) standards as regards decontamination of uranium from neptunium and which is the one which relates to UOX3 fuels (fuels which are initially enriched to 4.7% in $^{235}U$ and subject to a combustion rate of 60 $GWdt^{-1}$).

The present invention is thus based on these observations.

DISCUSSION OF THE INVENTION

The invention proposes a method for processing a spent nuclear fuel, which comprises a decontamination of uranium (VI) from one or more actinides(IV), which decontamination comprises an operation for stripping the actinide(IV) or the actinides(IV) from an organic phase, not miscible with water and wherein are present the uranium(VI) and the actinide(IV) or the actinides(IV), by putting the organic phase in contact with an aqueous phase comprising nitric acid and at least one complexing agent which more strongly complexes actinides(IV) than uranium(VI), and then separating the organic phase from the aqueous phase, and which is characterized in that said at least one complexing agent is a diglycolamide.

Thus, the method of the invention uses the capability which diglycolamides have of complexing in an aqueous phase much more strongly the actinides(IV) than the actinides(VI) and of allowing, when actinides(IV) are present in an organic phase together with uranium(VI) and when this organic phase is put into contact with an aqueous phase in which a diglycolamide is found, selective transfer of the actinides(IV) from the organic phase to the aqueous phase.

It is obvious that, as usual in the field of the processing of spent nuclear fuels, the organic phase in which the uranium (VI) and the actinide(IV) or the actinides(IV) are present and from which the latter are stripped comprises at least one extractant of uranium(VI), which is preferably TBP, in which case the latter is typically in solution in an organic diluent of the dodecane type, preferably in a volume ratio equal to or substantially equal to 30/70.

It should be noted that the capability of diglycolamides of complexing the actinides(IV) preferentially over actinides (VI) is known per se (Sasaki et al., *Analytical Sciences* 2007, 23(6), 727, hereafter reference [3]).

On the other hand, what is completely novel is that this capability is utilized for decontaminating uranium(VI) from actinides(IV) within the scope of a method for processing a spent nuclear fuel and, in particular, within the scope of the first purification cycle of the PUREX and COEX™ methods and, which is totally unexpected, is the fact that it leads to decontamination levels of the uranium from actinides(IV) such that it is possible to suppress the second purification cycle of the uranium which these methods comprise, provided that the decontamination of uranium from the fission products (mainly ruthenium and technetium) is moreover sufficient.

As a reminder, diglycolamides are compounds of formula (I) or of formula (II) hereafter:

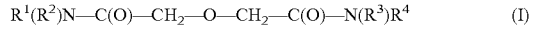

$$R^1(R^2)N—C(O)—CH_2—O—CH_2—C(O)—N(R^3)R^4 \quad (I)$$

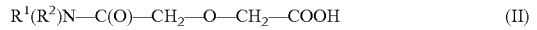

$$R^1(R^2)N—C(O)—CH_2—O—CH_2—COOH \quad (II)$$

wherein $R^1$, $R^2$, $R^3$ and $R^4$ are typically alkyl groups.

According to the invention, the diglycolamide is preferably selected from diglycolamides of formula (I) in which the total number of carbon atoms which $R^1$, $R^2$, $R^3$ and $R^4$ have together is at most equal to 12 and from diglycolamides of formula (II) wherein the number of carbon atoms which $R^1$ and $R^2$ have together is at most equal to 12, so as to exhibit sufficient hydrophilicity so as to be able to be used in an aqueous phase.

Such diglycolamides are notably N,N,N',N'-tetramethyldiglycolamide (or TMDGA, which fits formula (I) wherein $R^1=R^2=R^3=R^4=CH_3$), N,N,N',N'-tetraethyldiglycolamide (or TEDGA, which fits formula (I) wherein $R^1=R^2=R^3=R^4=C_2H_5$), N,N,N',N'-tetrapropyldiglycolamide (or TPDGA, which fits formula (I) wherein $R^1=R^2=R^3=R^4=C_3H_7$) and N,N-dipropyldiglycolamic acid (or DPDGAc, which fits formula (II) wherein $R^1=R^2=C_3H_7$).

Among these diglycolamides, TEDGA and TPDGA prove to have a higher complexing power for actinides(IV) than that of TMDGA and DPDGAc. Thus, preference is given to TEDGA and to TPDGA, TEDGA being most particularly preferred because, of these two diglycolamides, it is the one which is the most soluble in water and the less extractible with the extractant the most conventionally used in the processing of spent nuclear fuels, i.e. TBP.

In any case, the diglycolamide is advantageously present in the aqueous phase at a concentration ranging from 0.01 to 0.1 mol/L and, even better, from 0.02 to 0.05 mol/L.

As for nitric acid, it is preferably present in this aqueous phase in an amount from 0.2 to 3 mol/L and even better from 0.5 to 1.5 mol/L.

According to a preferred arrangement of the method of the invention, the decontamination of uranium(VI) from the actinide(IV) or the actinides(IV) further comprises an operation for washing the aqueous phase stemming from the stripping of the actinide(IV) or of the actinides(IV), by putting this aqueous phase in contact with an organic phase comprising an extractant of uranium(VI), and then by separating the organic phase from the aqueous phase.

This washing operation, which is intended for removing from the aqueous phase stemming from the stripping of the actinide(IV) or of the actinides(IV), the uranium(VI) fraction which may have been stripped together with this actinide(IV) or these actinides(IV), is preferably carried out by using an organic phase comprising TBP as an extractant, in which case the latter is typically used in solution in an organic diluent of the dodecane type, preferably in a volume ratio equal to or substantially equal to 30/70.

The set formed by the operation for stripping the actinide (IV) or the actinides(IV) and for washing the aqueous phase stemming from this stripping will be designated hereafter as "α-complexing barrier".

According to the invention, the actinide(IV) or the actinides(IV) are preferably selected from neptunium(IV), plutonium(IV) and thorium(IV) and more specially, from neptunium(IV) and plutonium(IV).

According to a first preferred embodiment of the method of the invention, the decontamination of uranium(VI) from one or more actinides(IV) is a decontamination of uranium (VI) from neptunium(IV).

According to a first arrangement of this first preferred embodiment, the method of the invention results from the introduction of an "α-complexing barrier" into the first purification cycle of a PUREX method in order to decontaminate uranium(VI) from neptunium(IV) during the step for partitioning the uranium and the plutonium, in which case the method of the invention preferably comprises:

a) a step for decontaminating the uranium and the plutonium present in an aqueous phase resulting from the dissolution of a spent nuclear fuel in nitric acid, from the actinides(III) and fission products also present in this phase, which step comprises:

$a_1$) at least one operation for co-extracting uranium, in the state of oxidation VI, and plutonium in the state of oxidation IV, from the aqueous phase, by putting this aqueous phase in contact with an organic phase comprising TBP in an organic diluent, and then separating the organic phase from the aqueous phase; and $a_2$) at least one operation for washing the organic phase stemming from $a_1$) to remove from this aqueous phase the fraction of fission products having been extracted during $a_1$), by putting said organic phase into contact with an aqueous phase comprising nitric acid, and then separating the organic phase from the aqueous phase;

whereby an organic phase is obtained, which comprises uranium(VI), plutonium(IV) and neptunium(VI);

b) a step for partitioning the uranium and the plutonium present in the organic phase stemming from step a) into two aqueous phases, a first aqueous phase comprising plutonium decontaminated from uranium and neptunium and a second aqueous phase comprising uranium decontaminated from plutonium and neptunium, which step comprises:

- $b_1$) an operation for stripping the plutonium present in the organic phase stemming from step a), the plutonium being stripped in the state of oxidation III by putting the organic phase stemming from step a) in contact with an aqueous phase comprising nitric acid, a reducing agent, for example uranyl nitrate, which reduces plutonium (IV) to plutonium(III) and neptunium(VI) to neptunium (IV) without reducing uranium(VI), and an anti-nitrous agent, for example hydrazinium nitrate, and then separating the organic phase from the aqueous phase;
- $b_2$) an operation for washing the organic phase stemming from $b_1$) to remove from this organic phase the plutonium fraction which has not been stripped during $b_1$), by putting said organic phase in contact with an aqueous phase comprising nitric acid, the same reducing agent and the same anti-nitrous agent than those used for stripping plutonium, and then separating the organic phase from the aqueous phase;
- $b_3$) an operation for washing the aqueous phase stemming from $b_1$) to remove from this aqueous phase the uranium(VI) and neptunium(IV) fraction having been stripped during $b_1$), by putting said aqueous phase in contact with an organic phase comprising TBP in an organic diluent, and then separating the organic phase from the aqueous phase;
- $b_4$) the decontamination of uranium(VI) from neptunium (IV), this decontamination comprising an operation for stripping the neptunium(IV) present in the organic phase stemming from $b_2$), by putting this organic phase in contact with an aqueous phase comprising nitric acid and the diglycolamide, and then separating the organic phase from the aqueous phase, and an operation for washing the aqueous phase stemming from the neptunium(IV) stripping operation, by putting this aqueous phase in contact with an organic phase comprising TBP in an organic diluent, and then separating the organic phase from the aqueous phase; and
- $b_5$) an operation for stripping the uranium(VI) present in the organic phase stemming from the neptunium(IV) stripping operation of $b_4$), by putting this organic phase in contact with an aqueous phase comprising nitric acid, and then separating the organic phase from the aqueous phase.

A first aqueous phase is thus obtained, which comprises plutonium(III) decontaminated from uranium and neptunium and which is the one stemming from $b_3$), a second aqueous phase which comprises uranium(VI) decontaminated from plutonium and neptunium and which is the one stemming from $b_5$), and a third aqueous phase which comprises neptunium(IV) and which is the one stemming from $b_4$).

According to another arrangement of this first preferred embodiment, the method of the invention results from the introduction of an "α-complexing barrier" in the first purification cycle of a COEX™ method in order to decontaminate uranium(VI) from neptunium(IV) during the partition of uranium and plutonium, in which case the method of the invention preferably comprises:

a) a step for decontaminating the uranium and the plutonium present in an aqueous phase resulting from the dissolution of a spent nuclear fuel in nitric acid, from the actinides(III) and fission products also present in this phase, which step is identical with step a) described earlier and leads, like it, to an organic phase which comprises uranium (VI), plutonium(IV) and neptunium(VI);

b) a step for partitioning the uranium and plutonium present in the organic phase stemming from step a) into two aqueous phases, a first aqueous phase comprising plutonium and uranium decontaminated from neptunium and a second aqueous phase comprising uranium decontaminated from plutonium and neptunium, which step comprises:

- $b_1$) an operation for stripping the plutonium and a fraction of the uranium present in the organic phase stemming from step a), the plutonium being stripped in the state of oxidation III by putting the organic phase stemming from step a) in contact with an aqueous phase comprising nitric acid, a reducing agent, for example uranyl nitrate, which reduces plutonium(IV) to plutonium(III) and neptunium(VI) to neptunium(IV) without reducing uranium(VI), and an anti-nitrous agent, for example hydrazinium nitrate, and then separating the organic phase from the aqueous phase;
- $b_2$) an operation for washing the organic phase stemming from $b_1$) to remove from this organic phase the plutonium fraction not having been stripped during $b_1$), by putting said organic phase in contact with an aqueous phase comprising nitric acid, the same reducing agent and the same anti-nitrous agent as those used for the plutonium stripping operation, and then separating the organic phase from the aqueous phase;
- $b_3$) an operation for washing the aqueous phase stemming from $b_1$) to remove from this aqueous phase the neptunium(IV) fraction having been stripped during $b_1$), by putting this aqueous phase in contact with an organic phase comprising TBP in an organic diluent, and then separating the organic phase from the aqueous phase;
- $b_4$) the decontamination of uranium(VI) from neptunium (IV), this decontamination comprising an operation for stripping neptunium(IV) present in the organic phase stemming from $b_2$), by putting this organic phase in contact with an aqueous phase comprising nitric acid and the diglycolamide, and then separating the organic phase from the aqueous phase, and an operation for washing the aqueous phase stemming from the neptunium(IV) stripping operation by putting this aqueous phase in contact with an organic phase comprising TBP in an organic diluent, and then separating the organic phase from the aqueous phase; and
- $b_5$) an operation for stripping the uranium present in the organic phase stemming from the neptunium(IV) stripping operation of $b_4$), by putting this organic phase in contact with an aqueous phase comprising nitric acid, and then separating the organic phase from the aqueous phase.

A first aqueous phase is thus obtained, with comprises plutonium(III) and uranium(VI) decontaminated from neptunium and which is the one stemming from $b_3$), a second aqueous phase which comprises uranium(VI) decontaminated from neptunium and plutonium and which is the one stemming from $b_5$), and a third aqueous phase which comprises neptunium(IV) and which is the one stemming from $b_4$).

According to a second preferred embodiment of the method of the invention, the decontamination of uranium (VI) from one or more actinides(IV) is a decontamination of uranium(VI) from neptunium(IV) and plutonium(IV).

According to a first arrangement of this second preferred embodiment, the method of the invention results from the introduction of an "α-complexing barrier" in the first purification cycle of a PUREX method in order to decontaminate uranium(VI) from neptunium(IV) and plutonium(IV) during the partitioning of the uranium and of the plutonium, in which case the method of the invention preferably comprises:

a) a step for decontaminating the uranium and the plutonium present in an aqueous phase resulting from the dissolution of a spent nuclear fuel in nitric acid, from the actinides(III) and fission products also present in this phase, which step is identical with step a) described earlier and leads, like it, to an organic phase which comprises uranium (VI), plutonium(IV) and neptunium(VI);

b) a step for partitioning the uranium and the plutonium present in the organic phase stemming from step a) into two aqueous phases, a first aqueous phase comprising plutonium decontaminated from uranium and neptunium and a second aqueous phase comprising uranium decontaminated from plutonium and neptunium, which step comprises:

$b_1$) an operation for stripping the plutonium present in the organic phase stemming from step a), the plutonium being stripped in the state of oxidation III by putting the organic phase stemming from step a) in contact with an aqueous phase comprising nitric acid, a reducing agent, for example uranyl nitrate, which reduces plutonium (IV) to plutonium(III) and neptunium(VI) to neptunium (IV) without reducing uranium(VI), and an anti-nitrous agent, for example hydrazinium nitrate, and then separating the organic phase from the aqueous phase;

$b_2$) an operation for washing the aqueous phase stemming from $b_1$) to remove from this phase the fraction of uranium(VI) and of neptunium(IV) having been stripped during $b_1$), by putting this aqueous phase in contact with an organic phase comprising TBP in an organic diluent, and then separating the organic phase from the aqueous phase;

$b_3$) the decontamination of uranium(VI) from neptunium (IV) and plutonium(IV), this decontamination comprising an operation for stripping the neptunium(IV) and the plutonium(IV) present in the organic phase stemming from $b_1$), by putting this organic phase in contact with an aqueous phase comprising nitric acid and the diglycolamide, and then separating the organic phase from the aqueous phase, and an operation for washing the aqueous phase stemming from the neptunium(IV) stripping operation by putting this aqueous phase in contact with an organic phase comprising TBP in an organic diluent, and then separating the organic phase from the aqueous phase; and $b_4$) an operation for stripping the uranium present in the organic phase stemming from the neptunium(IV) and plutonium(IV) stripping operation of $b_3$), by putting this organic phase in contact with an aqueous phase comprising nitric acid, and then separating the organic phase from the aqueous phase.

A first aqueous phase is thus obtained, which comprises plutonium(III) decontaminated from uranium and neptunium and which is the one stemming from $b_2$), a second aqueous phase which comprises uranium(VI) decontaminated from neptunium and plutonium and which is the one stemming from $b_4$), and a third aqueous phase which comprises neptunium(IV) and plutonium(IV) decontaminated from uranium(VI) and which is the one stemming from $b_3$).

According to another arrangement of this second preferred embodiment, the method of the invention results from the introduction of an "α-complexing barrier" into the first purification cycle of a COEX™ method in order to decontaminate uranium(VI) from neptunium(IV) and plutonium (IV) during the partitioning of uranium and plutonium, in which case the method of the invention preferably comprises:

a) a step for decontaminating the uranium and the plutonium present in an aqueous phase resulting from the dissolution of a spent nuclear fuel in nitric acid, from the actinides(III) and fission products also present in this phase, which step is identical with step a) described earlier and leads, like it, to an organic phase which comprises uranium (VI), plutonium(IV) and neptunium(VI);

b) a step for partitioning the uranium and the plutonium present in the organic phase stemming from step a) into two aqueous phases, a first aqueous phase comprising plutonium and uranium decontaminated from neptunium and a second aqueous phase comprising uranium decontaminated from neptunium and plutonium, which step comprises:

$b_1$) an operation for stripping the plutonium and a fraction of the uranium present in the organic phase stemming from step a), the plutonium being stripped in the state of oxidation III by putting the organic phase stemming from step a) in contact with an aqueous phase comprising nitric acid, a reducing agent, for example uranyl nitrate, which reduces plutonium(VI) to plutonium(III) and neptunium(VI) to neptunium(IV) without reducing uranium(VI), and an anti-nitrous agent, for example hydrazinium nitrate, and then separating the organic phase from the aqueous phase;

$b_2$) an operation for washing the aqueous phase stemming from $b_1$) to remove from this aqueous phase the neptunium(IV) fraction having been stripped during $b_1$), by putting said aqueous phase in contact with an organic phase comprising TBP in an organic diluent, and then separating the organic phase from the aqueous phase;

$b_3$) the decontamination of uranium(VI) from neptunium (IV) and plutonium(IV), this decontamination comprising an operation for stripping the neptunium(IV) and the plutonium(IV) present in the organic phase stemming from $b_1$), by putting this organic phase in contact with an aqueous phase comprising nitric acid and the diglycolamide, and then separating the organic phase from the aqueous phase, and an operation for washing the aqueous phase stemming from the neptunium(IV) stripping operation by putting this aqueous phase in contact with an organic phase comprising TBP in an organic diluent, and then separating the organic phase from the aqueous phase; and $b_4$) an operation for stripping the uranium present in the organic phase stemming from the neptunium(IV) stripping operation of $b_3$), by putting this organic phase in contact with an aqueous phase comprising nitric acid, and then separating the organic phase from the aqueous phase.

A first aqueous phase is thus obtained which comprises plutonium(III) and uranium(VI) decontaminated from neptunium and which is the one stemming from $b_2$), a second aqueous phase which comprises uranium(VI) decontaminated from neptunium and plutonium and which is the one stemming from $b_4$), and a third aqueous phase which comprises neptunium(IV) and plutonium(IV) decontaminated from uranium(VI) and which is the one stemming from $b_3$).

In all the cases, the operation for stripping neptunium(IV) or for stripping neptunium(IV) and plutonium(IV) is preferably carried out with an aqueous solution comprising from 0.2 to 3 mol/L of nitric acid and from 0.01 to 0.1 mol/L of TEDGA.

Moreover, the operation for stripping uranium (i.e. the operation corresponding to $b_5$) in the first preferred embodiment of the invention and to $b_4$) in the second preferred embodiment of the invention) is preferably carried out with an aqueous solution comprising from 0.005 to 0.05 mol/L of nitric acid and at a temperature from 45 to 55° C.

Other features and advantages of the invention will become apparent from the additional description which follows and which relates to exemplary embodiments of the method of the invention as well as to experimental tests having allowing validating this method.

It is obvious that these examples are only given as illustrations of the object of the invention and should not by any means be interpreted as a limitation of this object.

BRIEF DESCRIPTION OF THE FIGURES

In FIGS. 1 to 5, the rectangles represent multi-staged extractors such as those conventionally used in the processing of spent nuclear fuels (mixers-decanters, pulsed columns, centrifugal extractors); the organic phases entering or leaving these extractors are symbolized by solid lines while the aqueous phases entering or leaving these extractors are symbolized by dotted lines.

Moreover, in FIGS. 2 to 5, the "α-complexing barrier" which the exemplary embodiments of the method of the invention include, illustrated in these figures, is included in a dotted line frame so as to make it more visible.

DETAILED DISCUSSION OF PARTICULAR EMBODIMENTS

Figure 2:
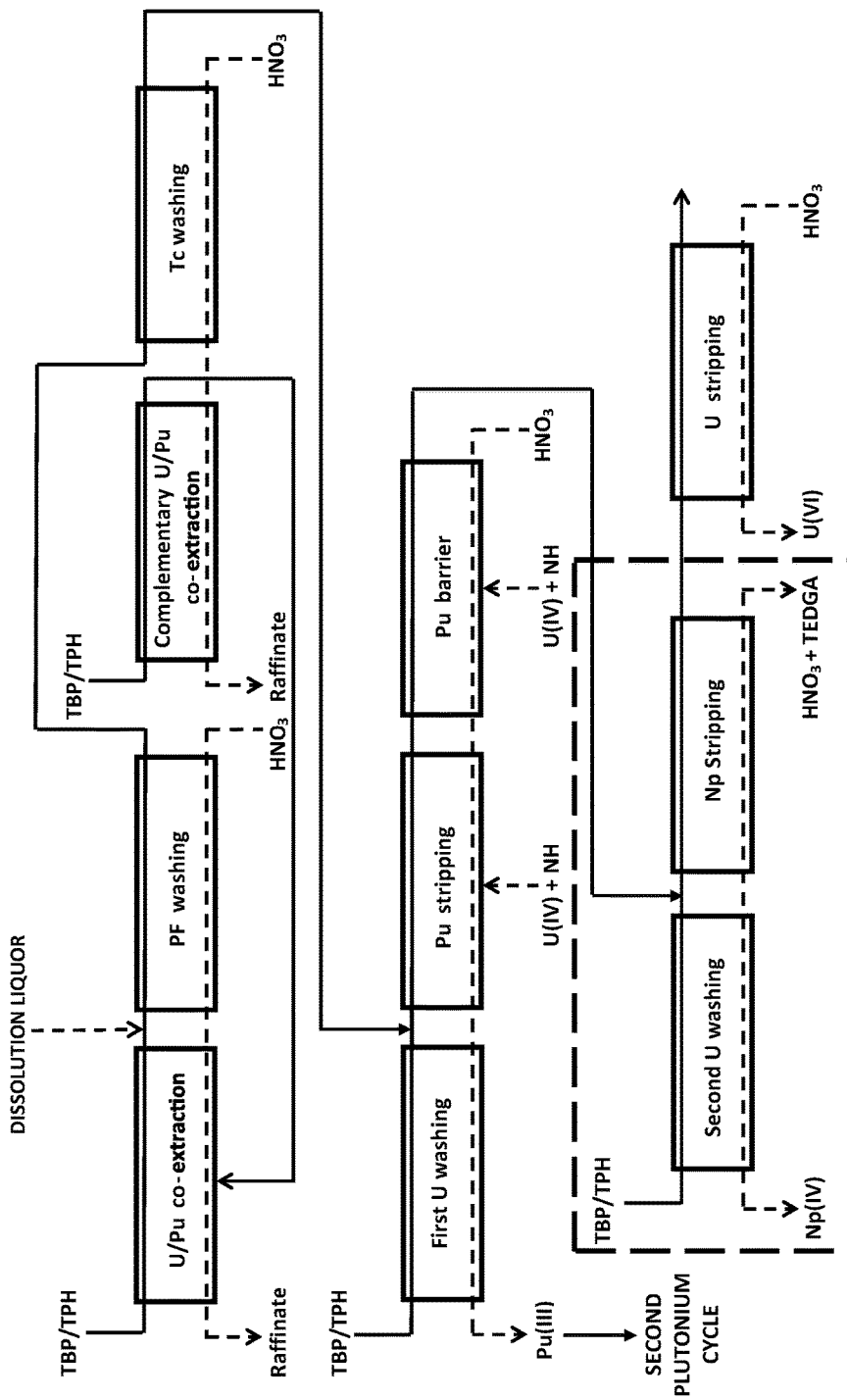
FIG. 2 illustrates a simplified diagram of a first exemplary embodiment of the method of the invention, in which the latter results from the introduction of an "α-complexing barrier" into the first purification cycle of the PUREX method illustrated in FIG. 1 in order to decontaminate uranium(VI) from neptunium(IV) during the partitioning of the uranium and of the plutonium.

Reference is first made to FIG. 2 which represents a first exemplary embodiment of the method of the 'invention.

Figure 1:
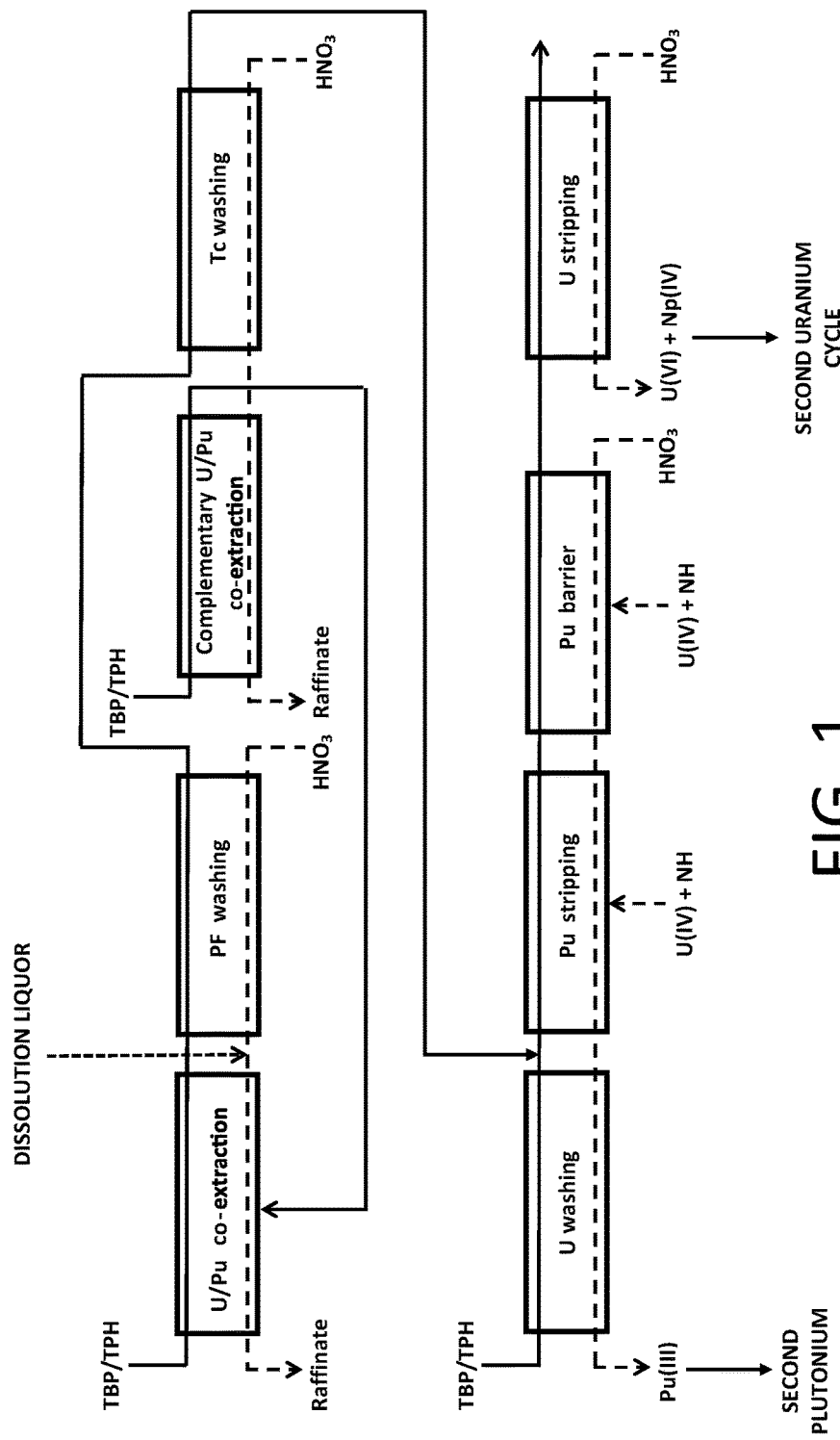
FIG. 1, upon which comments have already been made, illustrates a simplified diagram of the first purification cycle of the PUREX method as it is applied in the plants at La Hague in France.

In this example, the method of the invention results from the introduction of an "α-complexing barrier" into the first purification cycle of the PUREX method illustrated in FIG. 1 with view to decontaminating uranium(VI) from neptunium(IV) during the partitioning of the uranium and of the plutonium.

The "α-complexing barrier" is therefore used as an addition to the "Pu barrier".

The method of the invention first of all comprises a step for decontaminating the uranium and the plutonium from americium, curium and fission products, similar to the one which exists in the first purification cycle of the PUREX method.

This first step comprises:

an operation, designated as "U/Pu co-extraction", which aims at extracting together uranium and plutonium, the first in the state of oxidation VI, the second in the state of oxidation IV, from a dissolution liquor, by putting this liquor in contact with an organic phase comprising TBP in solution at about 30% (v/v) in an organic diluent, for example a dodecane like TPH, and then separating both phases;

an operation, designated as "PF washing", which aims at removing from the organic phase stemming from the "U/Pu co-extraction", the fraction of the fission products, in particular ruthenium and zirconium, having been extracted during this co-extraction, by putting this organic phase in contact with a nitric aqueous phase with moderate acidity, for example an aqueous solution of nitric acid of 1 to 3 M, and then separating both phases;

an operation, designated as "Tc washing", which aims at removing from the organic phase stemming from the "PF washing", the technetium fraction having been extracted during the "U/Pu co-extraction", by putting this organic phase in contact with a nitric aqueous phase of moderate acidity but higher than that of the nitric aqueous phase used for the "PF washing", for example an aqueous solution of nitric acid from 3 to 5 M, and then separating both phases; and an operation, designated as "complementary U/Pu co-extraction", which aims at recovering in organic phase the uranium and plutonium fractions having followed the technetium in the aqueous phase during the "Tc washing", by putting the aqueous phase stemming from this washing in contact with an organic phase also comprising TBP in solution at about 30% (v/v) in an organic diluent, and then separating both phases.

Four phases are thereby obtained:

both aqueous phases (or raffinates) stemming from the "U/Pu co-extraction" and "complementary U/Pu co-extraction", which are loaded with fission products and for the first of them, with americium and curium, and which are removed from the cycle;

the organic phase stemming from the "complementary U/Pu co-extractio", which is sent to the extractor where the "U/Pu co-extraction" takes place in order to be added to the organic phase flowing in this extractor; and the organic phase stemming from the "Tc washing", which is loaded with uranium(VI), plutonium(IV) but also with neptunium(VI) since the major portion of the neptunium present in the dissolution liquor is extracted with TBP.

Like in the first purification cycle of the PUREX method, this organic phase is directed towards an area at which is carried out a step for partitioning the uranium and the plutonium into two aqueous phases. On the other hand, this partitioning phase is carried out differently from that of the first purification cycle of the PUREX method since it comprises an "α-complexing barrier" between the "Pu barrier" and the "U stripping".

Also, as visible in FIG. 2, the partitioning step comprises:
- an operation, designated as "Pu stripping", which aims at stripping the plutonium from the organic phase stemming from the "Tc washing", by putting this organic phase in contact with a nitric aqueous phase of low acidity, for example an aqueous solution of nitric acid from 0.05 to 2 M, comprising a reducing agent on the one hand, for example uranous nitrate (or U(IV)), and an anti-nitrous agent on the other hand, for example hydrazinium nitrate, and then separating both phases; the reducing agent is used for reducing plutonium(IV) to plutonium(III) and neptunium(VI) to neptunium(IV) and this without reducing uranium(VI), while the anti-nitrous agent is used for both stabilizing the reducing agent and plutonium(III) by destroying the nitrous acid which tends to form in the aqueous phase;
- an operation, designated as "Pu barrier", which aims at enhancing the stripping of the plutonium, by putting the organic phase stemming from the "Pu stripping" in contact with a nitric aqueous phase of low acidity, for example an aqueous solution of nitric acid from 0.05 to 2 M, comprising the same reducing agent and the same anti-nitrous agent as those used for the "Pu stripping", and then separating both phases;
- an operation, designated as "first U washing", which aims at removing from the aqueous phase stemming from the "Pu stripping" the uranium fraction having been stripped together with the plutonium, by putting this aqueous phase in contact with an organic phase also comprising TBP in solution at about 30% (v/v) in an organic diluent, and then separating both phases;
- an operation, designated as "Np stripping", which aims at stripping the neptunium(IV) present in the organic phase stemming from the "Pu barrier", by putting this organic phase in contact with a nitric aqueous phase, for example an aqueous solution of nitric acid from 0.2 to 3 M, which comprises a diglycolamide, for example TEDGA at a concentration from 0.01 to 0.1 mol/L, and then separating both phases;
- an operation, designated as "second U washing", which aims at removing from the aqueous phase stemming from the "Np stripping", the uranium fraction having been stripped together with the neptunium, by putting this aqueous phase in contact with an organic phase also comprising TBP in solution at about 30% (v/v) in an organic diluent, and then separating both phases; and
- an operation, designated as "U stripping", which aims at stripping uranium from the organic phase stemming from the "Np stripping", by putting this organic phase in contact with a highly diluted nitric aqueous phase, for example an aqueous solution of nitric acid from 0.005 to 0.05 M, and then separating both phases.

Four phases are thereby obtained, i.e.:
- the aqueous phase stemming from the "first U washing", which comprises plutonium(III) decontaminated from uranium and neptunium and which may be directed, after an oxidation operation (not shown in FIG. 2) allowing setting back the plutonium to the state of oxidation IV, towards the "second plutonium cycle" with view to enhancing the decontamination of this plutonium from fission products which may still be present in this aqueous phase;
- the aqueous phase stemming from the "second U washing", which comprises neptunium decontaminated from uranium and plutonium and which may be removed from the cycle;
- the aqueous phase stemming from the "U stripping", which comprises uranium(VI) decontaminated from plutonium and neptunium and which may be directed towards a unit for converting uranium into uranium oxide capable of entering the manufacturing of new nuclear fuels, provided that the decontamination of this uranium from fission products is sufficient; and
- the organic phase stemming from the "U stripping", which may be directed towards a unit for washing and regenerating the organic phases.

Figure 3:
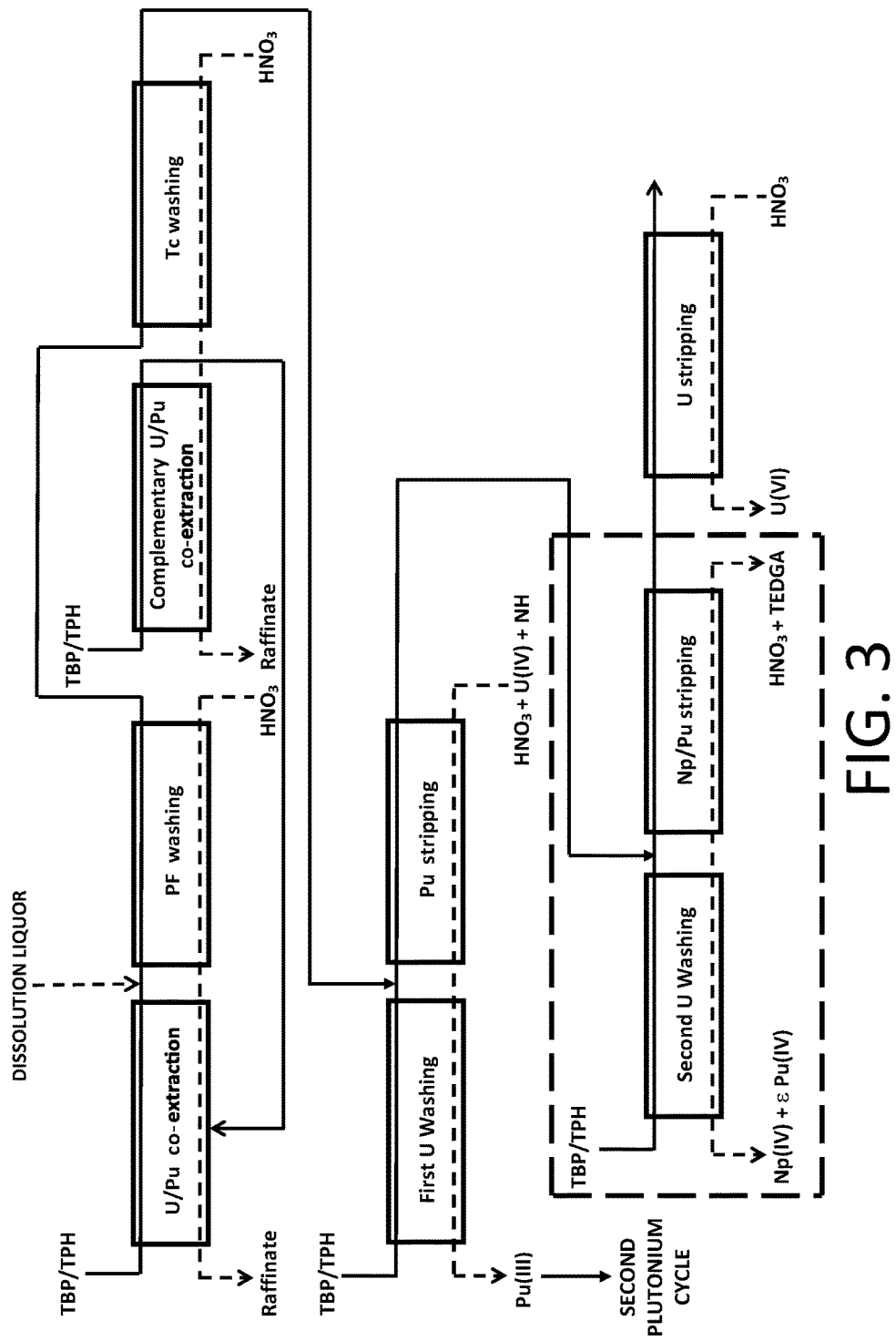
FIG. 3 illustrates a simplified diagram of a second exemplary embodiment of the method of the invention, wherein the latter results from the substitution of the "Pu barrier" with an "α-complexing barrier" in the first purification cycle of the PUREX method illustrated in FIG. 1 in order to decontaminate uranium(VI) from neptunium(IV) and plutonium(IV) during the partitioning of the uranium and of the plutonium.

A second exemplary embodiment of the method of the invention, wherein the latter results from the introduction of an "α-complexing barrier" in the first purification cycle of the PUREX method illustrated in FIG. 1 with view to decontaminating uranium(VI) from neptunium(IV) and plutonium(IV) during the partitioning of the uranium and of the plutonium, is illustrated in FIG. 3.

In this example, the method of the invention differs from the one which has just been described in that the partitioning step does not comprise any "Pu barrier" the latter being replaced with the "α-complexing barrier".

Also, the organic phase stemming from the "Pu stripping", which comprises uranium(VI), neptunium(IV) and plutonium(IV) (the latter being in the form of trace amounts), is directly subject to an operation, designated as "Np/Pu stripping", which aims at stripping neptunium(IV) and plutonium(IV) present in this organic phase, by putting into contact with a nitric aqueous phase of low acidity, for example an aqueous solution of nitric acid from 0.2 to 3 M, which comprises a diglycolamide, for example TEDGA at a concentration from 0.01 to 0.1 mol/L, and then separating both phases.

The aqueous phase stemming from the "Np/Pu stripping" is subject to an operation, designated as "second U washing", which aims at removing from the aqueous phase stemming from this stripping the uranium fraction having been stripped together with the neptunium and the plutonium, by putting this aqueous phase in contact with an organic phase, also comprising TBP in solution in an organic diluent, and then separating both phases.

The organic phase stemming from the "Np/Pu stripping" is, for its part, subject to an operation, designated as "U stripping", which aims at stripping the uranium from this organic phase, by putting this organic phase in contact with a highly diluted nitric aqueous phase, for example an aqueous solution of nitric acid from 0.005 to 0.05 M, and then separating both phases.

There again, four phases are obtained at the end of the partitioning step, i.e.:
- the aqueous phase stemming from the "first U washing", which comprises plutonium(III) decontaminated from uranium and neptunium and which may be directed, after an oxidation operation (not shown in FIG. 3) allowing setting back this plutonium to the state of oxidation IV, towards the "second plutonium cycle" with view to enhancing the decontamination of this plutonium from fission products which may still be present in this aqueous phase;

the aqueous phase stemming from the "second U washing", which comprises neptunium(IV) decontaminated from uranium as well as trace amounts of plutonium (IV) and which is directed either to the extractor where the "U/Pu co-extraction" takes place or to the extractor where the "complementary U/Pu co-extraction" takes place in order to recover the trace amounts of plutonium which it comprises;

the aqueous phase stemming from the "U stripping", which comprises uranium(VI) decontaminated from plutonium and neptunium and which may be directed to a unit for converting uranium into uranium oxide capable of entering the manufacturing of new nuclear fuels, provided that the decontamination of this uranium from fission products is sufficient; and the organic phase stemming from the "U stripping", which may be directed to a unit for washing and regenerating the organic phases.

Figure 4:
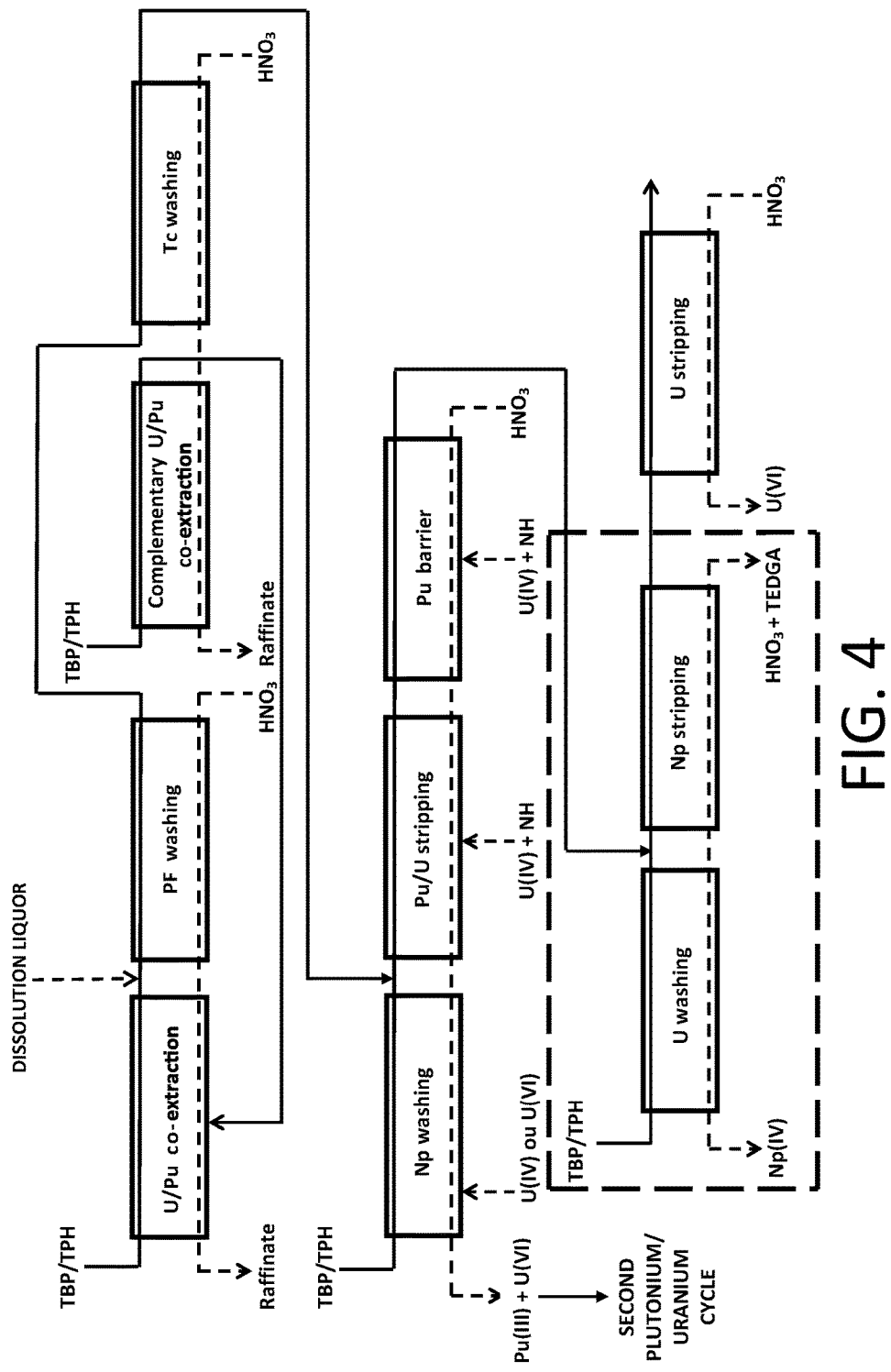
FIG. 4 illustrates a simplified diagram of a third exemplary embodiment of the method of the invention, wherein the latter results from the introduction of an "α-complexing barrier" in the first purification cycle of the method COEX™ as illustrated in FIG. 1 of reference [1] in order to decontaminate uranium(VI) from neptunium(IV) during the partitioning of the uranium and of the plutonium.

Now reference is made to FIG. 4 which illustrates a third exemplary embodiment of the method of the invention, wherein the latter results from the introduction of an "α-complexing barrier" in the first purification cycle of the method COEX™ as illustrated in FIGS. 1 and 4 of reference [1] in order to decontaminate uranium(VI) from neptunium (IV) during the partitioning of the uranium and of the plutonium.

In this example, the "α-complexing barrier" is therefore used in addition to the "Pu barrier".

The first purification cycle of the method COEX™ first of all comprises a step for decontaminating the uranium and the plutonium from fission products, americium and curium, which is carried out in the same way as in the PUREX method.

Therefore, in the present example, are again found the operations "U/Pu co-extraction", "PF washing", "Tc washing" and "complementary U/Pu co-extraction" described earlier, with the production of an organic phase, which is loaded with uranium(VI), plutonium(IV) but also with neptunium(VI).

Like in the first cycle of the COEX™ method, this organic phase is directed to an area at which is carried out a step for partitioning the uranium and the plutonium into two aqueous phases. However, this partitioning step is carried out differently from the one illustrated in FIGS. 1 and 4 of reference [1] since it comprises an "α-complexing barrier" between the "Pu barrier" and the "U stripping".

Also, as visible in FIG. 4, the partitioning step comprises:

an operation, designated as "Pu/U stripping", which aims at stripping from the organic phase stemming from the "Tc washing" the plutonium(IV) and a fraction of the uranium(VI) present in this phase, by putting this organic phase in contact with an aqueous phase with low acidity, for example a solution of nitric acid from 0.05 to 2 M, comprising a reducing agent on the one hand, for example uranous nitrate, and an anti-nitrous agent on the other hand, for example hydrazinium nitrate, and then separating both phases;

an operation, designated as "Pu barrier", which aims at enhancing the stripping of the plutonium(IV), by putting the organic phase stemming from the "Pu/U stripping" in contact with a nitric aqueous phase of low acidity, for example a solution of nitric acid from 0.05 to 2 M, comprising the same reducing agent and the same anti-nitrous agent as those used for the "Pu/U stripping", and then separating both phases;

an operation, designated as "Np washing", which aims at removing from the aqueous phase stemming from the "Pu/U stripping" the neptunium(IV) fraction having been stripped together with the plutonium and the uranium, by putting this phase into contact with an organic phase comprising TBP in a solution at about 30% (v/v) in an organic diluent, and then separating both phases;

an operation, designated as "Np stripping", which aims at stripping the neptunium(IV) present in the organic phase stemming from the "Pu barrier", by putting this organic phase in contact with a nitric aqueous phase of low acidity, for example an aqueous solution of nitric acid from 0.2 to 3 M, which comprises a diglycolamide, for example TEDGA at a concentration from 0.01 to 0.1 mol/L, and then separating both phases;

an operation, designated as "U washing", which aims at removing from the aqueous phase stemming from the "Np stripping", the uranium fraction having been stripped together with neptunium, by putting this aqueous phase in contact with an organic phase also comprising TBP in solution at about 30% (v/v) in an organic diluent, and then separating both phases; and an operation, designated as "U stripping", which aims at stripping the uranium from the organic phase stemming from the "Np stripping", by putting this organic phase in contact with a highly diluted nitric aqueous phase, for example an aqueous solution of nitric acid from 0.005 to 0.05 M, and then separating both phases.

Thus, four phases are obtained, i.e.:

the aqueous phase stemming from the "Np washing", which comprises plutonium(III) and uranium(VI and optionally IV) decontaminated from neptunium and which may be directed, after an oxidation operation (not shown in FIG. 4) allowing setting back plutonium (III) to the state of oxidation IV and, if necessary, uranium(IV) to the state of oxidation VI, towards the "second plutonium/uranium cycle" with view to enhancing the decontamination of this plutonium and of this uranium from fission products which may still be present in this aqueous phase;

the aqueous phase stemming from the "U washing", which comprises neptunium(IV) decontaminated from uranium and plutonium and which may be removed from the cycle;

the aqueous phase stemming from the "U stripping", which comprises uranium(VI) decontaminated from plutonium and neptunium and which may be directed to a unit for converting the uranium into uranium oxide capable of entering the manufacturing of new nuclear fuels, provided that the decontamination of this uranium from fission products is sufficient; and the organic phase stemming from the "U stripping", which may be directed to a unit for washing and regenerating the organic phases.

Figure 5:
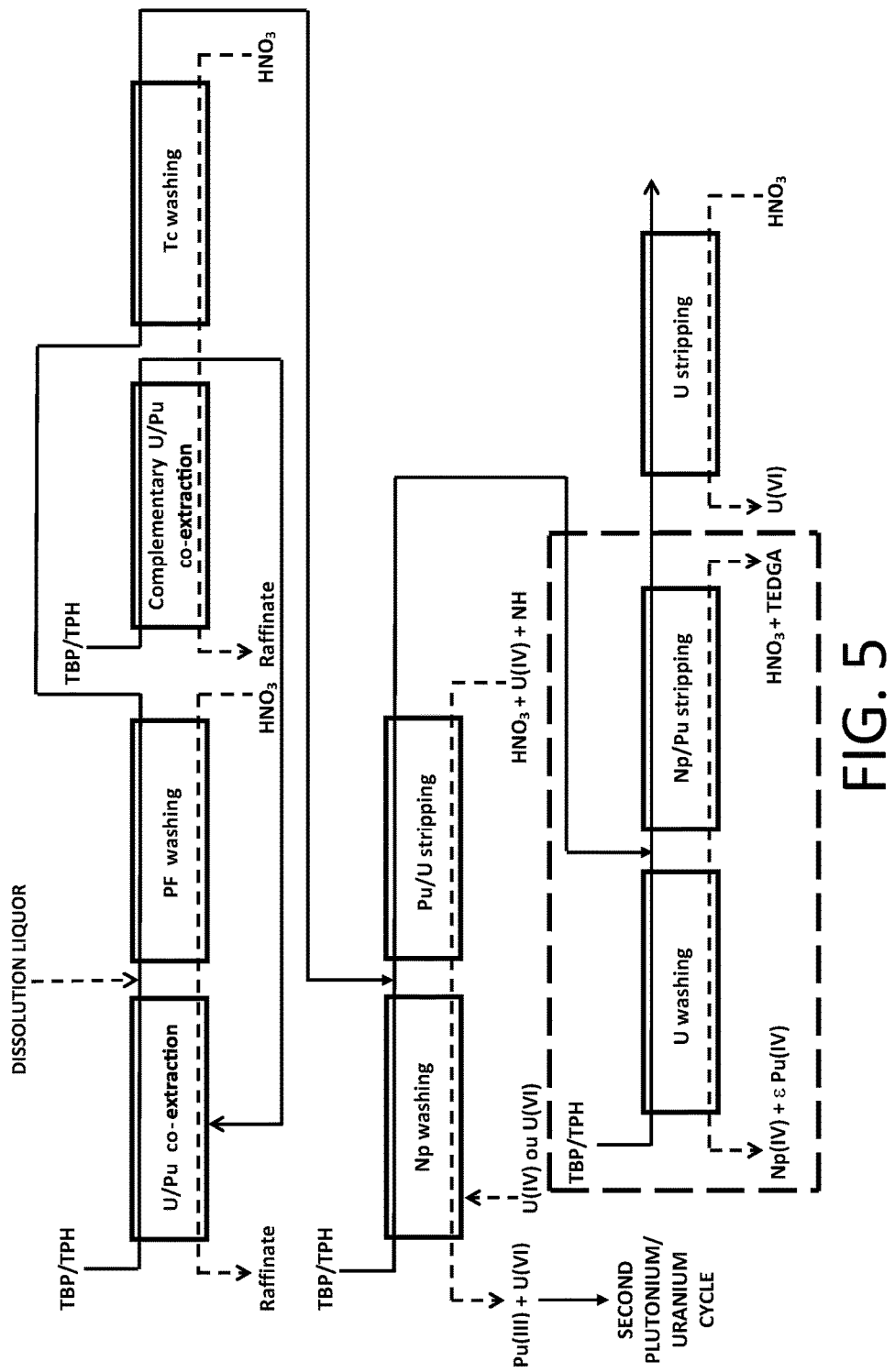
FIG. 5 illustrates a simplified diagram of a fourth exemplary embodiment of the method of the invention, wherein the latter results from the substitution of the "Pu barrier" with an "α-complexing barrier" in the first purification cycle of the method COEX™ as illustrated in FIGS. 1 and 4 of reference [1] in order to decontaminate uranium(VI) from neptunium(IV) and plutonium(IV) during the partitioning of the uranium and of the plutonium.

A fourth exemplary embodiment of the method of the invention, wherein the latter results from the introduction of an "α-complexing barrier" in the first purification cycle of the method COEX™ as illustrated in FIGS. 1 and 4 of reference [1] in order to decontaminate uranium(VI) from neptunium(IV) and plutonium(IV) during the partitioning, is illustrated in FIG. 5.

In this example, the method of the invention therefore differs from the one which has just been described in that the partitioning step does not comprise any "Pu barrier", the latter being replaced by the "α-complexing barrier".

Also, the organic phase stemming from the "Pu/U stripping", which comprises uranium(VI), neptunium(IV) and plutonium(IV) (the latter being in the form of trace amounts), is directly subject to an operation, designated as "Np/Pu stripping", which aims at stripping the neptunium (IV) and the plutonium(IV) present in this organic phase, by putting into contact with a nitric aqueous phase of low acidity, for example an aqueous solution of nitric acid from 0.2 to 3 M, which comprises a diglycolamide, for example TEDGA at a concentration from 0.01 to 1 mol/L, and then separating both phases.

The aqueous phase stemming from the "Np/Pu stripping" is subject to an operation, designated as "U washing", which aims at removing from the aqueous phase stemming from this stripping the uranium fraction having been stripped together with the neptunium and plutonium, by putting this aqueous phase in contact with an organic phase, also comprising TBP in solution in an organic diluent, while the organic phase stemming from the "Np/Pu stripping" is subject to an operation, designated as "U stripping", which aims at stripping the uranium from this organic phase, by putting this organic phase in contact with a highly diluted nitric aqueous phase, for example an aqueous solution of nitric acid from 0.005 to 0.05 M, and then separating both phases.

There again, at the end of the partitioning steps, four phases are obtained, i.e.:
   the aqueous phase stemming from the "Np washing", which comprises plutonium(III) and uranium(VI and optionally IV) decontaminated from neptunium and which may be directed, after an oxidation operation (not shown in FIG. 5) allowing to setting back plutonium(III) to the state of oxidation IV and, if necessary, uranium(IV) to the state of oxidation VI, towards the "second plutonium/uranium cycle" with view to enhancing the decontamination of this plutonium and of this uranium from fission products which may still be present in this aqueous phase;
   the aqueous phase stemming from the "U washing", which comprises neptunium(IV) decontaminated from uranium as well as trace amounts of plutonium(IV) and which is directed either to the extractor where the "U/Pu co-extraction" takes place, or to the extractor where the "complementary U/Pu co-extraction" takes place for recovering the trace amounts of plutonium which it comprises;
   the aqueous phase stemming from the "U stripping", which comprises uranium(VI) decontaminated from plutonium and neptunium and which may be directed to a unit for converting the uranium into uranium oxide capable of entering the manufacturing of new nuclear fuels, provided that the decontamination of this uranium from fission products is sufficient; and
   the organic phase stemming from the "U stripping", which may be directed to a unit for washing and regenerating the organic phases.

The invention is by no means limited to the embodiments which have just been described.

In particular, it is quite possible that two successive operations shown in FIGS. 2 to 5 as taking place in two different multi-staged extractors be carried out in the same multi-staged extractor, a portion of the extractor then being dedicated to the course of the first operation and the other portion of the extractor being dedicated to the course of the second operation.

The examples which follow correspond to experimental tests which have allowed validating the method of the invention. These tests are conducted by using TEDGA as a diglycolamide.

Example 1: Preliminary Tests in Test Tubes

1) Study at Thermodynamic Equilibrium Between the Organic and Aqueous Phases:

In these tests, as the organic phase to be treated, is used a solution of TBP at 30% (v/v) in TPH, which stems from the mixture of concentrated and elementary organic solutions of uranium(VI), of neptunium 237 in the state of oxidation IV and of plutonium(IV), by targeting the following concentrations: 80 g/L of U(VI), 70 mg/L of Np(IV) and 10 mg/L of Pu(IV).

These concentrations correspond to those which an organic phase typically has at the end of the « Pu stripping » operation of the PUREX method illustrated in FIG. 1, except as regards the plutonium which is introduced in excess in order to determine the decontamination factors from plutonium, noted as $DF_{Pu}$, with better accuracy.

Moreover, a trace element, i.e. neptunium 239, was added to the organic solution of Np(IV) in order to measure the decontamination from neptunium by γ spectrometry.

Moreover, as aqueous phases are used aqueous solutions which stem from the mixture of concentrated and elementary aqueous solutions of uranium(VI), of nitric acid and of TEDGA, in order to simulate an aqueous phase as obtained at equilibrium with the previous organic phase at the targeted acidity except for Np, Pu and TEDGA. These aqueous solutions comprise 40 g/L of U(VI), 1 mol/L of $HNO_3$ and an increasing TEDGA concentration, ranging from 0 mol/L to 0.05 mol/L.

Each aqueous phase is put into contact in a test tube with an equivalent volume of organic phase (O/A=1) and the tube is left with vibratory stirring for 30 minutes, at room temperature (~25° C.). The phases in contact are then separated and analyzed by γ and α spectrometry.

The table I hereafter shows the values of the distribution coefficients of neptunium 237, neptunium 239 and plutonium, as well as the values of the decontamination factors of uranium from these elements, as determined from results of these analyses, depending on the TEDGA concentration of the aqueous phases used.

TABLE I

| [TEDGA] (mol/L) | $D_{Np-237}$ | $DF_{Np-237}$ | $D_{Np-239}$ | $DF_{Np-239}$ | $D_{Pu}$ | $DF_{Pu}$ |
|---|---|---|---|---|---|---|
| 0 | 0.139 | 10 | 0.112 | 10 | 0.65 | 2.5 |
| 0.005 | 0.097 | 10 | 0.1 | 11 | — | — |
| 0.01 | 0.006 | 165 | 0.003 | 304 | — | — |
| 0.03 | 0.003 | 371 | 0.002 | 633 | 0.0125 | 81 |
| 0.05 | 0.008 | 131 | — | — | 0.0108 | 92 |

This table shows that a TEDGA concentration of 0.005 mol/L leads for neptunium to distribution coefficients and decontamination factors which are not significantly different from those obtained in the absence of TEDGA, which suggests that this concentration is too low for obtaining complexation of the neptunium by this ligand.

On the other hand, from 0.01 mol/L of TEDGA, the decontamination factors of the uranium from neptunium significantly increase for attaining a value greater than 300 as soon as this concentration is reached.

2) Kinetic Study:

In these tests, as an organic phase to be treated, is used a solution of TBP at 30% (v/v) in TPH, which comprises, like the one used in point 1) herein before, 80 g/L of uranium (VI), 70 mg/L of neptunium(IV) and 10 mg/L of plutonium (IV), but which further comprises 50 mg/l of dibutylphosphoric acid (HDBP), which is the main degradation product of TBP, and 1 g/L of uranium(IV), so as to come as close as possible to the composition of the organic phase which is obtained at the end of the "Pu stripping" operation of the PUREX method illustrated in FIG. 1, except as regards the plutonium which, there again, is introduced in excess.

HDBP is a compound which is known for slowing down the stripping kinetics of plutonium. As for U(IV), it will, as an actinide(IV), be complexed by TEDGA and decrease the amount of TEDGA available for complexing the plutonium and the neptunium.

As earlier, this organic phase stems from the mixture of concentrated and elementary organic solutions of U(VI), of Np(IV), of Pu(IV), of HDBP and of U(IV). $^{239}$Np was there again added to the organic solution of Np(IV) in order measure the decontamination from neptunium by $\gamma$ spectrometry.

As an aqueous phase, is used an aqueous solution which, like earlier, stems from the mixture of concentrated and elementary aqueous solutions of uranium(VI), of nitric acid and of TEDGA, in order to simulate an aqueous phase as obtained at equilibrium with the organic phase herein before at the targeted acidity except for Np, Pu and TEDGA. This aqueous solution comprises 40 g/L of U(VI), 1 mol/L of $HNO_3$ and 0.03 mol/L of TEDGA.

This aqueous phase is put into contact in a jacketed glass cell of 25 mL, thermostated to 25° C., with stirring by blade and anti-vortex trebuchet (2,000 rpm), with an equivalent volume of organic phase (O/A=1).

Taking of samples are carried out at 1, 3, 5, 7, 15 and 30 minutes after contacting of the aqueous and organic phases in order to follow the decontamination kinetics of the organic phase from neptunium and plutonium.

For each sample taken, the phases in contact are separated and analyzed by $\gamma$ and $\alpha$ spectrometry.

Table II hereafter shows the results of the analyses carried out on the aqueous phase of the samples. It indicates the activities of neptunium 239 and of plutonium (expressed in kBq per liter of aqueous phase) as measured by $\gamma$ spectrometry for neptunium 239 and by $\alpha$ spectrometry for plutonium, as well as the plutonium concentrations (expressed in mg/L) as measured by $\alpha$ spectrometry, depending on the contact time of the aqueous and organic phases.

TABLE II

| | Aqueous phase | | |
|---|---|---|---|
| Contact time (min) | [Np-239] (kBq/L) | [Pu] (kBq/L) | [Pu] (mg/L) |
| 1 | 600 | 3108 | 9.9 |
| 3 | 619 | 3268 | 10.4 |
| 5 | 637 | 3321 | 10.6 |
| 7 | 678 | 4296 | 13.7 |
| 15 | 605 | 3579 | 11.4 |
| 30 | 689 | 3559 | 11.3 |

Table III hereafter shows, for its part, the results of the analyses carried out on the organic phase of the samples. It indicates the activities of neptunium 239 (expressed in kBq per liter of organic phase) as determined by $\gamma$ spectrometry, the values of the distribution coefficients of neptunium 239 as well as the values of the decontamination factors of uranium from neptunium 239, depending on the contact time of the aqueous and organic phases.

TABLE III

| | Organic phase | | |
|---|---|---|---|
| Contact time (min) | [Np-239] (kBq/L) | $D_{Np\text{-}239}$ | $DF_{Np\text{-}239}$ |
| 0 | 618 | | |
| 3 | 14 | $2.3 \cdot 10^{-3}$ | 441 |
| 5 | 7 | $1.1 \cdot 10^{-3}$ | 866 |
| 7 | 13 | $1.9 \cdot 10^{-3}$ | 468 |
| 15 | 17 | $2.7 \cdot 10^{-3}$ | 372 |

These tables show that the values of the decontamination factor of uranium from neptunium 239 are greater than 300 after a single contact and 3 minutes of contact between the aqueous and organic phases.

The stripping kinetics of neptunium are fast and not limiting, even in the presence of 50 mg/L of HDBP and 1 g/L of U(IV).

Example 2: Experimental Tests in Batteries of Mixers-Decanters

Figure 6:
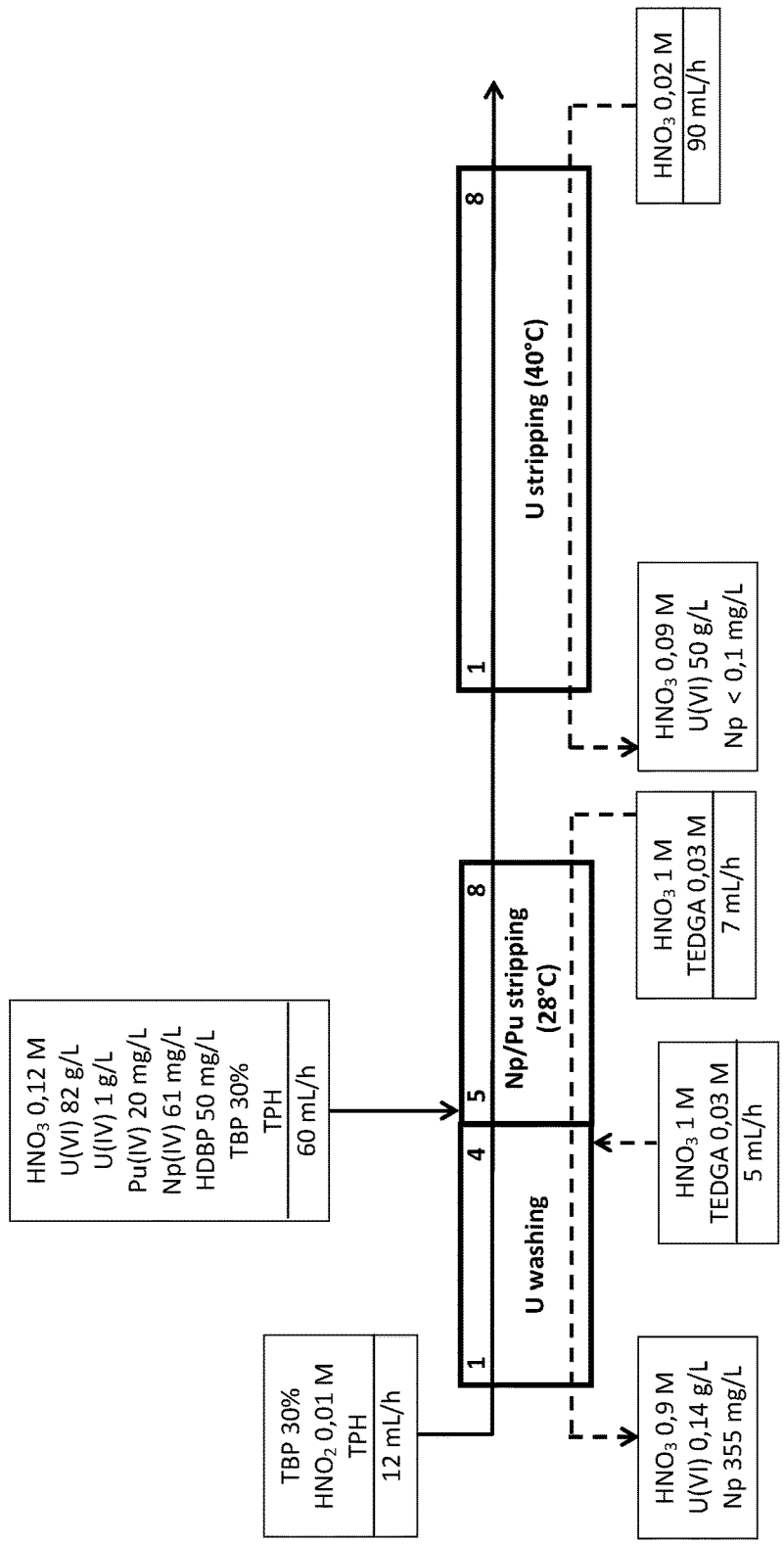
FIG. 6 illustrates the diagram used for experimental tests of applying an "α-complexing barrier" in batteries of mixers-decanters.

Experimental tests of applying an «$\alpha$-complexing barrier» are conducted by using two batteries of mixers-decanters each with 8 stages, according to the diagram shown in FIG. 6.

The organic phase to be treated comprises: 82 g/L of uranium(VI), 61 mg/L of neptunium(IV), 20 mg/L of plutonium(IV), 50 mg/L of HDBP and 30% (v/v) of TBP in TPH. $^{239}$Np was added to this phase in order to measure the decontamination from neptunium by $\gamma$ spectrometry.

The first battery of mixers-decanters is dedicated to the «$\alpha$-complexing barrier» and is divided into two areas each with 4 stages: a first area, designated as «Np/Pu stripping», for the stripping of neptunium(IV) and of plutonium(IV) and a second area, designated as «U washing», for the washing of the aqueous phase stemming from this stripping.

The second battery of mixers-decanters is entirely dedicated to the stripping of uranium(VI) from the organic phase stemming from the first battery of mixers-decanters. It is therefore called «U stripping».

As visible in FIG. 6, the supply solutions for the first battery of mixers-decanters are:
the organic phase to be treated which is introduced into stage 5 at the rated flow rate of 60 mL/h;
an aqueous phase comprising 1 mol/L of nitric acid and 0.03 mol/L of TEDGA, which is introduced into stage 8, at the rated flow rate of 7 mL/h, and into stage 4, at the rated flow of 5 mL/h; and
an organic phase which comprises 30% (v/v) of TBP diluted in TPH and 0.01 mol/L of nitrous acid for promoting oxidation of the uranium(IV) present in the organic phase to be treated; this organic phase is introduced into stage 1, at the rated flow of 12 mL/h.

The second battery of mixers-decanters is, for its part, supplied with the organic phase stemming from the «Np/Pu stripping» on the one hand, which is introduced into stage 1 and, with an aqueous solution comprising 0.02 mol/L of nitric acid on the other hand, which is introduced into stage 8, at the rated flow of 90 mL/h.

The temperature prevailing in the first battery of mixers-decanters is of 28° C. while the one which prevails in the second battery is 40° C.

Under these conditions, the stationary equilibrium condition is attained after about 6 hours.

The activity of neptunium 239 is measured by γ spectrometry in the organic phase to be treated and in the aqueous phases stemming from the «U washing» and from the «U stripping». Also, the concentrations of uranium(VI), neptunium(IV) and plutonium(IV) are measured by X-Fluorescence or ICP-AES in each of these phases.

The results of these measurements are shown in Table IV hereafter as well as the decontamination factors of uranium from neptunium on the one hand, and from plutonium on the other hand.

TABLE IV

|  | Organic phase to be treated | Aqueous phase stemming from "U washing" | Aqueous phase stemming from "U stripping" | U/Np or Pu DF |
|---|---|---|---|---|
| U (g/L) | 82 | 0.14 | 49.94 |  |
| Np(IV) (mg/L) | 61.4 | 355.3 | <0.1 | >374 |
| $^{239}$Np (kBq/L) | 3 000 | 15 010 | 0.5 | 3654 |
| Pu (mg/L) | 20 | 103 | <0.1 | >122 |

This table shows that a decontamination factor of uranium from neptunium close to 3,650, i.e. more than 10 times greater than the one required by the most strict specification having been defined to this day by the UNIREP standards as regards decontamination of uranium from neptunium and which is 308. The introduction of an "α-complexing barrier" in a PUREX or COEX™ method, according to the diagram shown in FIG. 6, therefore makes it possible to get rid of the requirement of carrying out the "second uranium cycle", provided that the decontamination of the uranium from the fission products is moreover sufficient.

REFERENCES CITED

[1] WO 2007/135178
[2] WO 2005/052950
[3] Sasaki et al., *Analytical Sciences* 2007, 23(6), 727

The invention claimed is:

1. A method for processing a spent nuclear fuel, which comprises a decontamination of uranium(VI) from an actinide(IV), the decontamination comprising at least a stripping of the actinide(IV) from an organic phase, which is not miscible with water and which comprises uranium(VI) and the actinide(IV), the stripping comprising putting the organic phase in contact with an aqueous phase comprising nitric acid and at least one complexing agent which more strongly complexes actinides(IV) than uranium(VI), and then separating the organic phase from the aqueous phase, the complexing agent being a diglycolamide.

2. The method of claim 1, wherein the diglycolamide is N,N,N',N'-tetramethyldiglycolamide, N,N,N',N'-tetraethyldiglycolamide, N,N,N',N'-tetrapropyldiglycolamide, N,N-dipropyldiglycolamic acid, or mixtures thereof.

3. The method of claim 2, wherein the diglycolamide is N,N,N',N'-tetraethyldiglycolamide.

4. The method of claim 1, wherein the aqueous phase comprises from 0.01 mol/L to 0.1 mol/L of diglycolamide.

5. The method of claim 1, wherein the aqueous phase comprises from 0.2 mol/L to 3 mol/L of nitric acid.

6. The method of claim 1, wherein the decontamination of uranium(VI) from the actinide(IV) further comprises a washing of the aqueous phase stemming from the stripping of the actinide(IV), the washing comprising putting the aqueous phase in contact with an organic phase comprising an extractant of uranium(VI), and then separating the organic phase from the aqueous phase.

7. The method of claim 6, wherein the extractant is tri-n-butyl phosphate.

8. The method of claim 1, wherein the actinide(IV) is neptunium(IV), plutonium(IV), thorium(IV), or mixtures thereof.

9. The method of claim 1, wherein the decontamination of uranium(VI) from the actinide(IV) is a decontamination of uranium(VI) from neptunium(IV).

10. The method of claim 9, comprising:
  a) a treatment of a first aqueous phase resulting from a dissolution of a spent nuclear fuel in nitric acid and comprising uranium(VI), plutonium(IV), neptunium(VI), actinides(III) and fission products, to decontaminate uranium(VI), plutonium(IV) and neptunium(VI) from the actinides(III) and the fission products, the treatment comprising:
    $a_1$) a co-extraction of uranium(VI), plutonium(IV) and neptunium(VI) from the first aqueous phase, the co-extraction comprising putting the first aqueous phase in contact with an organic phase comprising tri-n-butyl phosphate in an organic diluent, and then separating the organic phase from the first aqueous phase; and
    $a_2$) a washing of the organic phase from $a_1$), the washing comprising putting the organic phase into contact with a second aqueous phase comprising nitric acid, and then separating the organic phase from the second aqueous phase; whereby a first organic phase is obtained, which comprises uranium(VI), plutonium(IV) and neptunium(VI);
  b) a partition of the uranium and the plutonium present in the first organic phase into two aqueous solutions, a first aqueous solution comprising plutonium decontaminated from uranium and neptunium, and a second aqueous solution comprising uranium decontaminated from plutonium and neptunium, the partition comprising:
    $b_1$) a stripping of the plutonium present in the first organic phase, the plutonium being stripped in oxidation state III and the stripping comprising putting the first organic phase in contact with a third aqueous phase comprising nitric acid, a reducing agent which reduces plutonium(IV) to plutonium(III) and neptunium(VI) to neptunium(IV) without reducing uranium(VI), and an anti-nitrous agent, and then separating the first organic phase from the third aqueous phase;
    $b_2$) a washing of the first organic phase from $b_1$) to remove from the first organic phase the plutonium fraction not having been stripped during $b_1$), the washing comprising putting the first organic phase in contact with a fourth aqueous phase comprising nitric acid, a reducing agent and an anti-nitrous agent identical to the reducing agent and the anti-nitrous agent used in $b_1$), and then separating the first organic phase from the fourth aqueous phase;
    $b_3$) a washing of the third aqueous phase from $b_1$) to remove from the third aqueous phase the fraction of uranium(VI) and of neptunium(IV) having been stripped during $b_1$), the washing comprising putting the third aqueous phase in contact with a second organic phase comprising tri-n-butyl phosphate in an organic diluent, and then separating the second organic phase from the third aqueous phase;

b₄) a decontamination of uranium(VI) from neptunium(IV), the decontamination comprising a stripping of the neptunium(IV) present in the first organic phase from b₂), by putting the first organic phase in contact with a fifth aqueous phase comprising nitric acid and the diglycolamide, and then separating the first organic phase from the fifth aqueous phase, and a washing of the fifth aqueous phase stemming from the neptunium(IV) stripping, by putting the fifth aqueous phase in contact with a third organic phase comprising tri-n-butyl phosphate in an organic diluent, and then separating the third organic phase from the fifth aqueous phase; and b₅) a stripping of the uranium(VI) present in the first organic phase from b₄), the stripping comprising putting the first organic phase in contact with a sixth aqueous phase comprising nitric acid, and then separating the first organic phase from the sixth aqueous phase.

11. The method of claim 9, comprising:
a) a treatment of a first aqueous phase resulting from a dissolution of a spent nuclear fuel in nitric acid and comprising uranium(IV), plutonium(IV), neptunium(VI), actinides(III) and fission products, to decontaminate uranium(VI), plutonium(IV) and neptunium(VI) from the actinides(III) and fission products, the treatment comprising:
  a₁) a co-extraction of uranium(VI), plutonium(IV) and neptunium(VI) from the first aqueous phase, the co-extraction comprising putting the first aqueous phase in contact with an organic phase comprising tri-n-butyl phosphate in an organic diluent, and then separating the organic phase from the first aqueous phase; and
  a₂) a washing of the organic phase from a₁), the washing comprising putting the organic phase into contact with a second aqueous phase comprising nitric acid, and then separating the organic phase from the second aqueous phase;
whereby a first organic phase is obtained, which comprises uranium(VI), plutonium(IV) and neptunium(VI);
b) a partition of the uranium and the plutonium present in the first organic phase into two aqueous solutions, a first aqueous solution comprising plutonium and uranium decontaminated from neptunium and a second aqueous solution comprising uranium decontaminated from neptunium and plutonium, the partition comprising:
  b₁) a stripping of the plutonium and of a fraction of the uranium present in the first organic phase, the plutonium being stripped in oxidation state III and the stripping comprising putting the first organic phase in contact with a third aqueous phase comprising nitric acid, a reducing agent which reduces plutonium(IV) to plutonium(III) and neptunium(VI) to neptunium(IV) without reducing uranium(VI), and an anti-nitrous agent, and then separating the first organic phase from the third aqueous phase;
  b₂) a washing of the first organic phase from b₁) to remove from the first organic phase the plutonium fraction not having been stripped during b₁), the washing comprising putting the first organic phase in contact with a fourth aqueous phase comprising nitric acid, a reducing agent and an anti-nitrous agent identical to the reducing agent and the anti-nitrous agent used in b₁), and then separating the first organic phase from the fourth aqueous phase;
  b₃) a washing of the third aqueous phase from b₁) to remove from the third aqueous phase the neptunium(IV) fraction having been stripped during b₁), the washing comprising putting the third aqueous phase in contact with a second organic phase comprising tri-n-butyl phosphate in an organic diluent, and then separating the second organic phase from the third aqueous phase;
  b₄) a decontamination of uranium(VI) from neptunium(IV), the decontamination comprising a stripping of the neptunium(IV) present in the first organic phase from b₂), by putting the first organic phase in contact with a fifth aqueous phase comprising nitric acid and the diglycolamide, and then separating the first organic phase from the fifth aqueous phase, and a washing of the fifth aqueous phase stemming from the neptunium(IV) stripping, by putting the fifth aqueous phase in contact with a third organic phase comprising tri-n-butyl phosphate in an organic diluent, and then separating the third organic phase from the fifth aqueous phase; and
  b₅) a stripping of the uranium present in the first organic phase from b₄), the stripping comprising putting the first organic phase in contact with a sixth aqueous phase comprising nitric acid, and then separating the first organic phase from the sixth aqueous phase.

12. The method of claim 1, wherein the decontamination of uranium(VI) from the actinide(IV) is a decontamination of uranium(VI) from neptunium(IV) and plutonium(IV).

13. The method of claim 12, comprising:
a) a treatment of a first aqueous phase resulting from a dissolution of a spent nuclear fuel in nitric acid and comprising uranium(VI), plutonium(IV), neptunium(VI), actinides(III) and fission products, to decontaminate uranium(VI), plutonium(IV) and neptunium(VI) from the actinides(III) and fission products, the treatment comprising:
  a₁) a co-extraction of uranium(VI), plutonium(IV) and neptunium(VI) from the first aqueous phase, the co-extraction comprising putting the first aqueous phase in contact with an organic phase comprising tri-n-butyl phosphate in an organic diluent, and then separating the organic phase from the first aqueous phase; and
  a₂) a washing of the organic phase from a₁), the washing comprising putting the organic phase into contact with a second aqueous phase comprising nitric acid, and then separating the organic phase from the second aqueous phase;
whereby a first organic phase is obtained, which comprises uranium(VI), plutonium(IV) and neptunium(VI);
b) a partition of the uranium and the plutonium present in the first organic phase into two aqueous solutions, a first aqueous solution comprising plutonium decontaminated from uranium and neptunium and a second aqueous solution comprising uranium decontaminated from plutonium and neptunium, the partition comprising:
  b₁) a stripping of the plutonium present in the first organic phase, the plutonium being stripped in oxidation state III and the stripping comprising putting the first organic phase in contact with a third aqueous phase comprising nitric acid, a reducing agent which reduces plutonium(IV) to plutonium(III) and neptunium(VI) to neptunium(IV) without reducing uranium(VI), and an anti-nitrous agent, and then separating the first organic phase from the third aqueous phase;

b$_2$) a washing of the third aqueous phase from b$_1$) to remove from the third aqueous phase the fraction of uranium(VI) and of neptunium(IV) having been stripped during b$_1$), the washing comprising putting the third aqueous phase in contact with a second organic phase comprising tri-n-butyl phosphate in an organic diluent, and then separating the second organic phase from the third aqueous phase;

b$_3$) a decontamination of uranium(VI) from neptunium(IV) and plutonium(IV), the decontamination comprising a stripping of the neptunium(IV) and of the plutonium(IV) present in the first organic phase from b$_1$), by putting the first organic phase in contact with a fourth aqueous phase comprising nitric acid and the diglycolamide, and then separating the first organic phase from the fourth aqueous phase, and a washing of the fourth aqueous phase stemming from the neptunium(IV) and plutonium(IV) stripping, by putting the fourth aqueous phase in contact with a third organic phase comprising tri-n-butyl phosphate in an organic diluent, and then separating the third organic phase from the fourth aqueous phase; and b$_4$) a stripping of the uranium(VI) present in the first organic phase from b$_3$), the stripping comprising putting the first organic phase in contact with a fifth aqueous phase comprising nitric acid, and then separating the first organic phase from the fifth aqueous phase.

14. The method of claim 12, comprising:

a) a treatment of a first aqueous phase resulting from a dissolution of a spent nuclear fuel in nitric acid and comprising uranium(VI), plutonium(IV), neptunium(VI), actinides(III) and fission products, to decontaminate uranium(VI), plutonium(IV) and neptunium(VI) from the actinides(III) and fission products, the treatment comprising:

a$_1$) a co-extraction of uranium(VI), plutonium(IV) and neptunium(VI) from the first aqueous phase, the co-extraction comprising putting the first aqueous phase in contact with an organic phase comprising tri-n-butyl phosphate in an organic diluent, and then separating the organic phase from the first aqueous phase; and a$_2$) a washing of the organic phase from a$_1$), the washing comprising putting the organic phase into contact with a second aqueous phase comprising nitric acid, and then separating the organic phase from the second aqueous phase;

whereby a first organic phase is obtained, which comprises uranium(VI), plutonium(IV) and neptunium(VI);

b) a partition of the uranium and the plutonium present in the first organic phase from step a) into two aqueous solutions, a first aqueous solution comprising plutonium and uranium decontaminated from neptunium and a second aqueous solution comprising uranium decontaminated from plutonium and neptunium, the partition comprising:

b$_1$) a stripping of the plutonium present in the first organic phase, the plutonium being stripped in oxidation state III and the stripping comprising putting the first organic phase in contact with a third phase comprising nitric acid, a reducing agent which reduces plutonium(IV) to plutonium(III) and neptunium(VI) to neptunium(IV) without reducing uranium(VI), and an anti-nitrous agent, and then separating the first organic phase from the third aqueous phase;

b$_2$) a washing of the third aqueous phase from b$_1$) to remove from the third aqueous phase the fraction of neptunium(IV) having been stripped during b$_1$), the washing comprising putting the third aqueous phase in contact with a second organic phase comprising tri-n-butyl phosphate in an organic diluent, and then separating the second organic phase from the third aqueous phase;

b$_3$) the decontamination of uranium(VI) from neptunium(IV) and plutonium(IV), the decontamination comprising a stripping of the neptunium(IV) and of the plutonium(IV) present in the first organic phase from b$_1$), by putting the first organic phase in contact with a fourth aqueous phase comprising nitric acid and the diglycolamide, and then separating the first organic phase from the fourth aqueous phase, and a washing of the fourth aqueous phase stemming from the neptunium(IV) and plutonium(IV) stripping, by putting the fourth aqueous phase in contact with a third organic phase comprising tri-n-butyl phosphate in an organic diluent, and then separating the third organic phase from the fourth aqueous phase; and b$_4$) a stripping of the uranium(VI) present in the first organic phase from b$_3$), the stripping comprising putting the first organic phase in contact with a fifth aqueous phase comprising nitric acid, and then separating the first organic phase from the fifth aqueous phase.

15. The method of claim 10, wherein the fifth aqueous phase comprises from 0.2 mol/L to 3 mol/L of nitric acid and from 0.01 mol/L to 0.1 mol/L of N,N,N',N'-tetraethyldiglycolamide.

16. The method of claim 11, wherein the fifth aqueous phase comprises from 0.2 mol/L to 3 mol/L of nitric acid and from 0.01 mol/L to 0.1 mol/L of N,N,N',N'-tetraethyldiglycolamide.

17. The method of claim 13, wherein the fourth aqueous phase comprises from 0.2 mol/L to 3 mol/L of nitric acid and from 0.01 mol/L to 0.1 mol/L of N,N,N',N'-tetraethyldiglycolamide.

18. The method of claim 14, wherein the fourth aqueous phase comprises from 0.2 mol/L to 3 mol/L of nitric acid and from 0.01 mol/L to 0.1 mol/L of N,N,N',N'-tetraethyldiglycolamide.

* * * * *